(12) United States Patent
Hämmerle et al.

(10) Patent No.: US 9,164,229 B2
(45) Date of Patent: *Oct. 20, 2015

(54) BEND INSENSITIVE GRADIENT INDEX MULTI-MODE LIGHT CONDUCTING FIBER

(71) Applicant: J-FIBER GMBH, Jena (DE)

(72) Inventors: Wolfgang Hämmerle, Jena (DE); Christian Genz, Jena (DE); Lothar Brehm, Jena (DE); Falk Wirth, Jena (DE)

(73) Assignee: J-FIBER GMBH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,030

(22) Filed: Jul. 23, 2014

(65) Prior Publication Data

US 2014/0334787 A1 Nov. 13, 2014

Related U.S. Application Data

(63) Continuation-in-part of application No. 13/654,975, filed on Oct. 18, 2012, now Pat. No. 8,805,145.

(30) Foreign Application Priority Data

Mar. 2, 2012 (DE) .......................... 10 2012 203 345
Aug. 7, 2012 (DE) .......................... 10 2012 213 983

(51) Int. Cl.
*G02B 6/02* (2006.01)
*G02B 6/028* (2006.01)
*G02B 6/036* (2006.01)
*G02B 6/12* (2006.01)

(52) U.S. Cl.
CPC ............ *G02B 6/0288* (2013.01); *G02B 6/0365* (2013.01); *G02B 6/03622* (2013.01); *G02B 2006/12119* (2013.01)

(58) Field of Classification Search
CPC ............... G02B 6/0281; G02B 6/0288; G02B 6/03627; G02B 6/0365
USPC ......................................... 385/124, 126, 127
See application file for complete search history.

(56) References Cited

U.S. PATENT DOCUMENTS

| | | | |
|---|---|---|---|
| 7,903,918 B1 | 3/2011 | Bickham et al. | |
| 8,805,145 B2 * | 8/2014 | Hämmerle et al. | ........... 385/124 |
| 2010/0310218 A1 | 12/2010 | Molin et al. | |
| 2011/0058781 A1 | 3/2011 | Molin et al. | |

(Continued)

OTHER PUBLICATIONS

Provost et al. "Connectivity and compatibility performance of Bend-Insensitive Multimode Fibers". *Proceedings of the 60th IWCS Conference*, pp. 176-184 (2011).

(Continued)

*Primary Examiner* — Ryan Lepisto
(74) *Attorney, Agent, or Firm* — Hamre, Schumann, Mueller & Larson, P.C.

(57) ABSTRACT

The invention relates to a bend insensitive gradient index multi-mode light conducting fiber comprising a leakage mode dependent optical core diameter that is uniform over its length and a numerical aperture that is uniform over its length, wherein for a light wavelength of 850 nm and an overfilled launch (OFL), the optical core diameter for a fiber length in a range between 2 m and 100 m decreases by less than 5% and the numerical aperture decreases by less than 2.5% and the curvature related attenuation increase for two turns and a curvature radius of 7.5 mm is less than 0.2 db.

10 Claims, 4 Drawing Sheets

(56) References Cited

U.S. PATENT DOCUMENTS

2012/0230638 A1    9/2012   Bickham et al.
2012/0251062 A1   10/2012   Molin et al.
2013/0004135 A1    1/2013   Bigot-Astruc et al.

OTHER PUBLICATIONS

Englebert et al. "The facts about bend-insensitive multimode fibers". *Cabling Installation & Maintenance*, vol. 19, Issue 1 (2011).

\* cited by examiner

BEND INSENSITIVE GRADIENT INDEX MULTI-MODE LIGHT CONDUCTING FIBER

The invention relates to a bend insensitive gradient index multi-mode light conducting fiber.

A standard gradient index multi-mode light conducting fiber subsequently designated as GIMM-fiber includes a fiber core with a so-called alpha-refraction index profile, wherein the refraction index difference of the core relative to a surrounding cladding is essentially a power function of the radius. The core is made from doped silica and the cladding is preferably made from non-doped fused silica. Fibers of this type have already been used for many years.

It is known that the so-called macro-bend losses of fibers of this type can be reduced by inserting a so-called refraction index trench between the center core and the surrounding cladding. The refraction index trench is a portion in which the refraction index is lowered relative to the core and also relative to the cladding. Fibers of this type are also designated as bend insensitive multi-mode fibers with the abbreviation BIMMF. The macro-bend properties of such BIMMF with respect to an attenuation increase, the measured wavelength, the number of turns and the bend radius are described in standardized international specifications.

It is a consequence of the trench concept to reduce the macro-bend losses that in a BIMM light conducting fiber so-called leakage modes are also generated as a function of excitation conditions besides the typically occurring propagation capable modes. That is, an addition of a trench to reduce the macro-bend losses results in generating leakage modes as a function of excitation conditions. One of these frequently occurring excitation types is designated as overfilled launch excitation (OFL excitation). For an excitation of this type, the directly light conducting core of the light conductor fiber is overfilled through excitation with a light source.

In OFL excitations, leakage modes are generated which can propagate over several hundred meters.

In standard GIMM light conducting fibers, without the recited trench concept, leakage modes can only be observed over a length of a few millimeters from the coupling location and they do not have any practical significance. In BIMMF with trench structure, the leakage modes, however, are run through the refraction index trench over a longer distance. This means that the increase in insensitivity relative to macro-bends which is obtained through the trench concept of the BIMMF over the standard GIMM light conducting fibers causes a disadvantage through leakage mode conduction, in particular for an OFL excitation.

This leakage mode conduction has negative impacts on the optical properties of the light conducting fibers which depend from the fiber length. GIMM light conducting fibers are defined with respect to their light conducting properties through the parameter of the optical core diameter and the numerical aperture. Thus, an excitation over the entire diameter of the geometric fiber core is presumed. The geometric fiber core is defined by the configuration of the light conducting fiber. The optical core diameter contrary thereto describes the portion of the fiber core that is effectively usable for light conduction.

Thus, the optical core diameter decreases with increasing length of the light conducting fiber. This is caused by the leakage modes described supra which exit from the fiber core and which limit the core diameter of the light conducting fiber that is actually suitable for light conduction with increasing fiber length. This leakage mode attenuation is independent from the so-called fiber base attenuation which occurs due to the fiber material. The leakage mode attenuation practically exclusively depends from the refraction index distribution in the fiber core and generally also in the fiber cross-section.

The length dependency of the optical core diameter and of the numerical aperture caused by the leakage modes is also independent from the actually provided macro-bend of the light conducting fiber and thus also dependent from its installation type. Fiber bends are typically designated as macro-bends in which the fiber axially deviates from a straight line with a bend radius in the dm, cm, or mm range. Macro-bend losses do not result from leakage mode conduction, but are partially caused by modes of higher order which are not run in the core anymore for increasing bending so that their power portion is emitted and therefore lost. Furthermore, macro-bends attenuate each mode that is run in the fiber because the electromagnetic field reaches into the fiber cladding further in the outside. This attenuation increase is the larger, the smaller the bending radius of the fiber and the greater the wavelength of the conducted light. The longitudinal dependency of the optical core diameter caused by leakage modes, however, also occurs when the fiber is oriented completely straight.

Thus, a light conducting fiber can be provided which shows little sensitivity relative to macro-bends. However, this introduces high leakage mode conduction into the light conducting fiber which regardless of the installation mode of the light conducting fiber, can only be influenced very little.

For bend insensitive light conducting fibers, therefore, the smallest possible change of the optical core diameter and the numerical aperture as a function of the fiber length is desirable. In order to characterize the dependency of the optical core diameter from the fiber length, a measuring procedure is used that is defined according to the international GIMMF standard. Thus, the optical core diameter is determined at a 2 m long fiber piece through a standard measurement and compared with the optical core diameter at a second fiber length, for example for 300 or 1,000 m, Typically, fiber lengths are selected in which the length dependency of the optical core diameter becomes clearly apparent. For most fiber designs it is preferable to use a 100 m length fiber for the second measurement, since the dependence becomes clearly apparent and the fiber length used for the measurement is reduced.

Due to the leakage mode attenuation, the optical core diameter with increasing fiber length reaches a substantially constant value, however, the coupling properties of the light conducting fiber are degraded through this damping effect and additionally depend from the length of the light conducting fiber.

For bend insensitive light conducting fibers, therefore, the smallest possible change of the optical core diameter and the numerical aperture as a function of the fiber length is desirable. In order to characterize the dependency of the optical core diameter from the fiber length, a measuring procedure is used that is defined according to the international GIMMF standard. Thus, the optical core diameter is determined at a 2 m long fiber piece through a standard measurement and compared with the optical core diameter at a second fiber length, for example for 300 or 1,000 m. Typically, fiber lengths are selected in which the length dependency of the optical core diameter becomes clearly apparent.

Another problem when using the BIMM fibers is that the parameters that are important for a specification of the fiber and for determining fiber-, splicing- and coupling-losses like e.g. the optical core diameter or its NA cannot be determined in a simple manner. The fiber parameters determined through OFL excitation using measurement methods configured for standard GIMM fibers have proven too large for applications to BIMM fibers. This leads to misinterpretations with respect to the splicing and coupling losses that shall be estimated and also for compatibility considerations of the measurement values compared to standard GIMM fibers.

Thus, it is an object of the invention to provide a GIMM light conducting fiber which is insensitive against bending which has a configuration under the conditions of the occurring leakage modes which provides the smallest length dependency of the optical core diameter that is possible. It shall be facilitated on the one hand side to provide a light conducting fiber which is sufficiently insensitive against macro-bends in which however on the other hand side the leakage mode propagation is substantially minimized. This relates in particular to providing the best possible parameters for the optical core diameter and the numerical aperture of the light conducting fiber for OFL excitations while simultaneously complying with minimum requirements for macrobending.

This object is achieved with a bend insensitive GIMM light conducting fiber with the features of claim 1.

The bend insensitive GIMM light conducting fiber with an optical core diameter and a numerical aperture includes a core, an inner cladding or bar, a refraction index trench and an outer cladding. It is characterized in that the core includes a core radius, an alpha refraction index profile and a core refraction index difference with respect to the outer cladding. The refraction index trench has a trench radius and a trench refraction index difference with respect to the outer cladding and the outer cladding has an outer cladding radius and a refraction index between 1.40 and 1.55, wherein the parameters are set so that for a light wavelength of 850 nm and an overfilled launch (OFL) the optical core diameter for a fiber length in a range from 2 m to 300 m is reduced by less than 5% and the numerical aperture is reduced by less than 2.5% and the bend related attenuation increase for two turns and a bend radius of 7.5 mm is less than 0.2 dB.

The fiber configuration according to the invention of the bend insensitive GIMM light conducting fiber is thus based on a core with an alpha refraction index profile and combines this core with a refraction index trench and a cladding enveloping the core. Thus, the core has a positive refraction index difference from the surrounding cladding, wherein the refraction index trench has a lower refraction index compared to the cladding. The basic idea of the fiber configuration according to the invention is to adjust the dimensions of the core, the refraction index trench and of the cladding so that the lowest possible length dependency of the optical core diameter and of the numerical aperture is achieved. Thus, the bend related attenuation increase is lowered under the recited value.

In an advantageous embodiment of the fiber configuration, the core is enveloped by an inner cladding, wherein the inner core includes an inner cladding radius and an inner cladding refraction index difference relative to the outer cladding.

In an advantageous embodiment, the inner cladding refraction index difference has a value of $2\times10^{-3}$ to $-3\times10^{-3}$ relative to the outer cladding.

In an advantageous embodiment, the inner cladding refraction index difference has a value of $2\times10^{-3}$ to $3\times10^{-3}$ relative to the outer cladding.

Furthermore, an inner cladding with a width B can be provided in the refraction index profile between the core and refractive index trench. The inner cladding width in one embodiment is 1 to 5 µm.

In an advantageous embodiment, the core has a geometric core diameter between 48 and 50 µm for a numerical core aperture of 0.18 to 0.22 and a core refraction index difference between $12\times10^{-3}$ and $17\times10^{-3}$ relative to the outer cladding. Thus, the refraction index difference of the inner cladding relative to the outer cladding is 0, the width of the refraction index trench is between 2 and 5 µm and the depth of the refraction index trench is from $-6\times10^{-3}$ to $-11\times10^{-3}$.

In another embodiment, the core includes a core refraction index step, wherein the core refraction index step has a value from $-1.0\times10^{-3}$ to $1.0\times10^{-3}$.

The total fiber diameter in one embodiment is between 120 and 130 µm. This is the standard diameter for most single and multi-mode fibers. Other diameters can also be used with the inventive concept disclosed here. For example there are fibers having a outer diameter of 200±10 µm which utilize the inventive concept. The diameter of the fiber is not a critical parameter for the optical core diameter and numerical aperture decrease, so the invention is not limited to any fiber diameter.

Furthermore, an outer coating can be provided that envelops the light conducting fiber, wherein the diameter of the coating is 230 to 510 µm. This shall not represent a limitation since as discussed above the inventive concept is independent of the coating parameters. What is of importance for the disclosed invention is the core diameter. The concept can be applied to a core having a diameter of 47.5 to 52.5 µm or to a core with a diameter of 60 to 65 µm. In principle this concept can also be used for other fiber designs with smaller or larger cores, but due to their modal structure it is necessary to optimize the parameters of the inner cladding and refractive index trench.

There are even fiber designs with a 50 or 62.5 µm core where a reduction of the length dependence of core diameter and numerical aperture can be achieved. One alternative design is a fiber with a core and the refractive index trench directly adjacent to the optical core. This leads to a decrease in the variation of the core diameter and numerical aperture when comparing a 2 m fiber with a 300 m fiber. By optimizing the parameters of the refractive index trench it is possible to reduce the length dependence of the core diameter and numerical aperture even more. Table 1 shows some exemplary fiber designs without an inner cladding and their core diameter and numerical aperture decrease. The 300 m length is used as the reference length to calculate the relative decrease.

|  | dn3 | b | B | NA (300 m) | NA (2 m) | NA decrease | CD (300 m) | CD (2 m) | CD decrease |
|---|---|---|---|---|---|---|---|---|---|
| Example 1 | −5.5 | 3.0 | 0.0 | 0.189 | 0.193 | 2.12% | 50.00 | 50.98 | 1.96% |
| Example 2 | −10.0 | 3.0 | 0.0 | 0.204 | 0.208 | 1.96% | 53.20 | 53.78 | 1.09% |
| Example 3 | −3.1 | 6.0 | 0.0 | 0.189 | 0.195 | 3.17% | 51.14 | 52.04 | 1.76% |
| Example 4 | −6.2 | 6.0 | 0.0 | 0.193 | 0.211 | 9.33% | 50.49 | 52.28 | 3.55% |
| Example 5 | −6.8 | 5.9 | 0.0 | 0.190 | 0.216 | 13.68% | 46.53 | 50.28 | 8.06% |
| Example 6 | −10.0 | 6.0 | 0.0 | 0.228 | 0.270 | 18.42% | 52.46 | 53.96 | 2.86% |

For examples 1-3 the core diameter and numerical aperture decrease is within the parameters specified in the claims. When using a very broad and deep trench the decrease of NA and CD is significantly increased. So by adjusting the trench parameters in the correct way it is possible to reduce the length dependence of core diameter and numerical aperture, even without using an inner cladding layer. For this purpose the product of trench width b and trench depth dn3 must not be larger than 35 for fiber designs without an inner cladding.

A further embodiment the core diameter was 62.3 μm and the inner cladding had a radius of 32.7 μm with a refractive index trench radius of 35.5 μm and fiber diameter of 124 μm. The surrounding coating was applied with a thickness of 58.5 μm. The refractive index trench had a depth of $-9.2 \times 10^{-3}$. The optical core diameter for a 100 m fiber sample was measured to 62.77 μm and for a 2 m length the optical core diameter was measured to 65.7 μm. This results in a decrease of 2.93 μm which is 4.67% taken the 100 m length as reference. The numerical aperture decreases from 0.289 (2 m) to 0.281 (100 m). The decrease was 2.85% using the 100 m fiber as reference. The bend related attenuation increase for an overfilled launch excitation at 850 nm was measured to 0.57 dB (1 turn @5 mm) and 0.81 dB (2 turns@5 mm). This value is significantly lower than for standard 62.5 μm fibers having a bend loss of 1.93 and 2.18 dB (1 and 2 turns@5 mm).

In another embodiment a 50 or 62.5 μm core is used within an outer cladding with a diameter of 200 μm. These fibers are usually used for data transfer in industrial systems designed for 200 μm fibers. These fibers were used with step index core profiles, but using a gradient index core in these fibers increases the bandwidth. To reduce unwanted losses within the system a trench may be added to these fibers. By adding a trench it becomes necessary to optimize the trench parameters with respect to a minimum decrease of core diameter and numerical aperture. This is important for the coupling properties of these fibers. The trench can be added with an inner cladding or directly at the core of the fiber. When using an inner cladding its width is an additional parameter to optimize the decrease of core diameter and numerical aperture.

The bend insensitive GIMM light conducting fibers according to the invention shall be subsequently described in more detail with reference to an exemplary embodiment. FIG. 1 through 4 are being referred to. The same reference numerals are being used for identical or equivalent components in the drawing figures, wherein:

Figure 1:
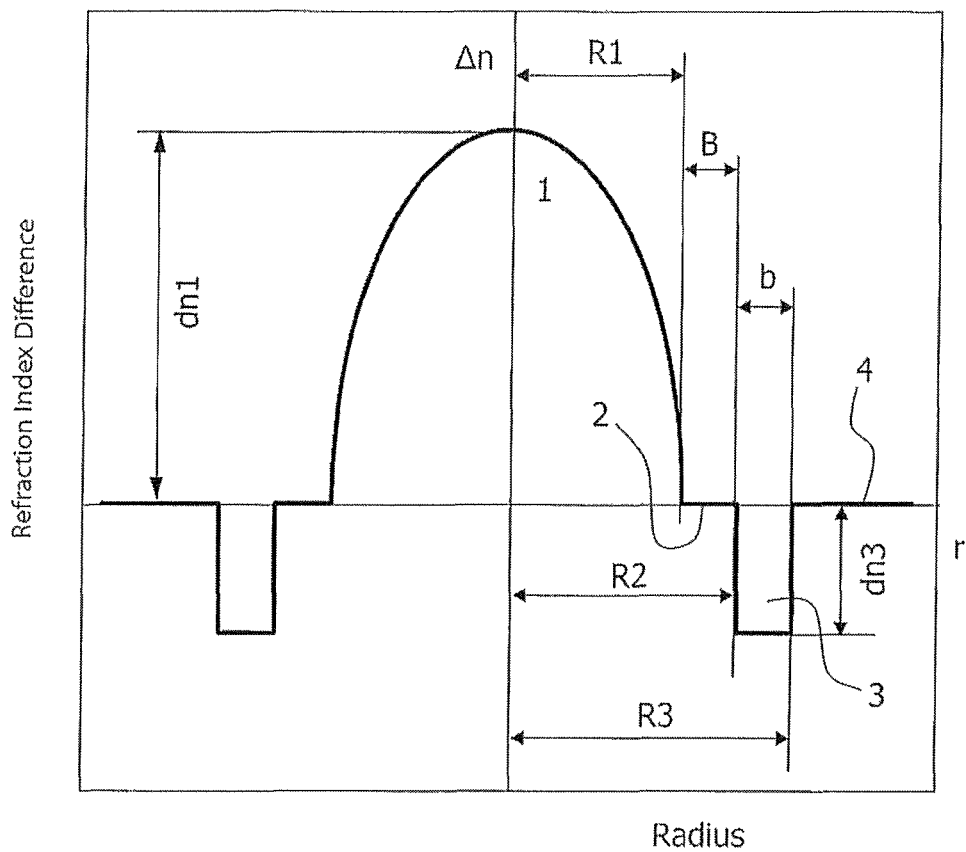
FIG. 1 illustrates a first exemplary refraction index profile with a gradient index core and a refraction index trench.

FIG. 1 illustrates a first exemplary refraction index profile of the bend insensitive GIMM light conducting fiber. The depiction illustrates the refraction index.difference relative to a reference value as a function of the radius of the light conducting fiber. The light conducting fiber has a core 1 with a so-called alpha-refraction index profile. The general diagram of the refraction index difference is defined for example by the formula:

$$\Delta n(R) = dn1 \cdot \left(1 - \left[\frac{R}{R1}\right]^\alpha\right)$$

Therein dn1 is the refraction index difference in the center of the fiber for R=0, R1 is the core radius and α is the so-called profile exponent. The diagram of the core profile defined by this formula describes an approximation of the actually produced profile distribution. For further illustrations, the deviation of the actual refraction index diagram from the ideal refraction index diagram is of subordinate importance, since the deviations are typically very small in modern GIMM light conducting fibers.

The core 1 is enveloped by an inner cladding 2 and a trench 3. An outer cladding 4 adjoins the trench in an outward direction. The inner cladding has a radius R2, the trench has a radius R3 and a trench width b. The refraction index of the trench is reduced relative to the refraction index of the outer cladding and is visible in the profile as a trench depth dn3.

It is apparent in the instant first embodiment that the inner cladding 2 is at the same refraction index level as the outer cladding 4. An exemplary fiber design with the instant refraction index profile has for example the following values: R1~24 μm; R2~27 μm; core-NA~0.20; dn1~$13.8 \times 10^{-3}$; b~3 μm; dn3~$-9 \times 10^{-3}$; the radius of the entire fiber~62.5 μm with a radius of a surrounding coating of approximately 122 μm.

Figure 2:
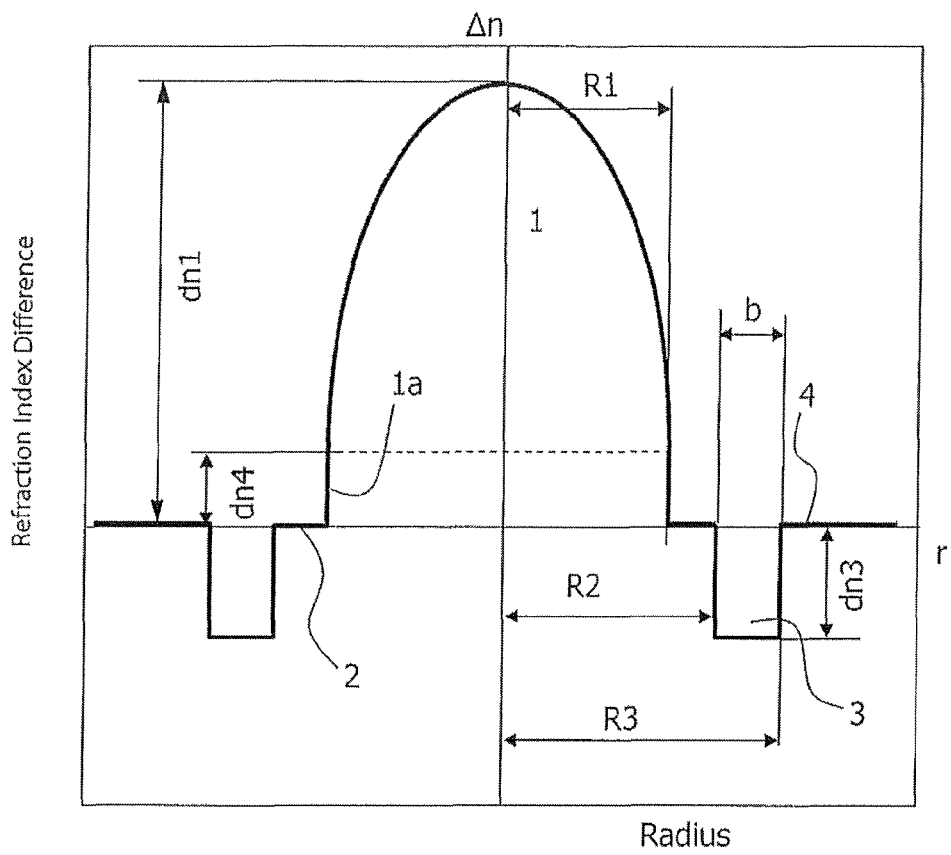
FIG. 2 illustrates a second exemplary refraction index profile with a gradient index core and with a core refraction index step, an inner cladding directly joining the core and a refraction index trench connected thereto.

FIG. 2 illustrates another embodiment. At the beginning of the core at R1, there is a core refraction index step 1a with a core refraction index step in the amount of dn4. The core refraction index step dn4 refers to the outer cladding refraction index and can have positive values (0 to $1 \times 10^{-3}$) and also negative values (0 to $-1 \times 10^{-3}$). The core radius R1 and the core refraction index dn1 essentially correspond to the embodiment of FIG. 1. Also for this fiber design, the core 1 is enveloped by an inner cladding 2 and a trench 3. The inner cladding 2 has a radius R2, the trench radius is R2.

Figure 3:
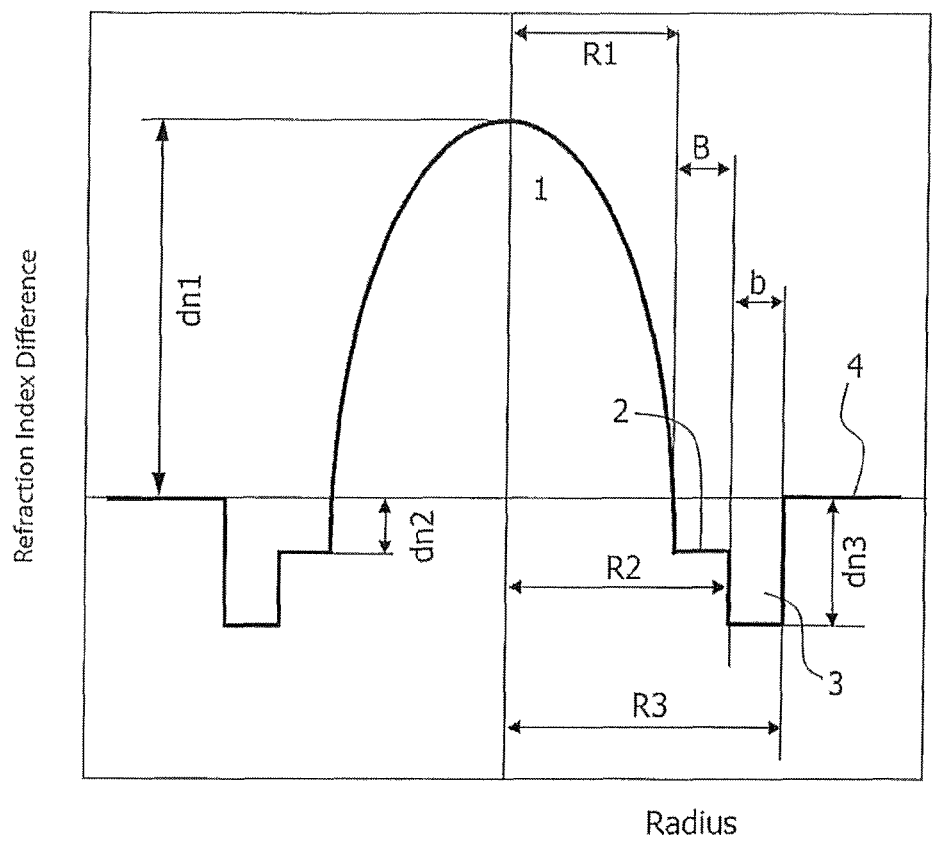
FIG. 3 illustrates a third refraction index profile with a gradient index core and an inner cladding with an inner cladding refraction index difference relative to the outer cladding.

FIG. 3 illustrates an embodiment in which the inner cladding has a lower refraction index level than the outer cladding. Thus, an inner cladding refraction index difference dn2 is provided with respect to the outer cladding. Exemplary values for dn2 are in the range of $2 \times 10^{-3}$ to approx. $-3 \times 10^{-3}$. In the embodiment of FIG. 3, all other parameters can be configured essentially like in the embodiment of FIG. 1.

Figure 4:
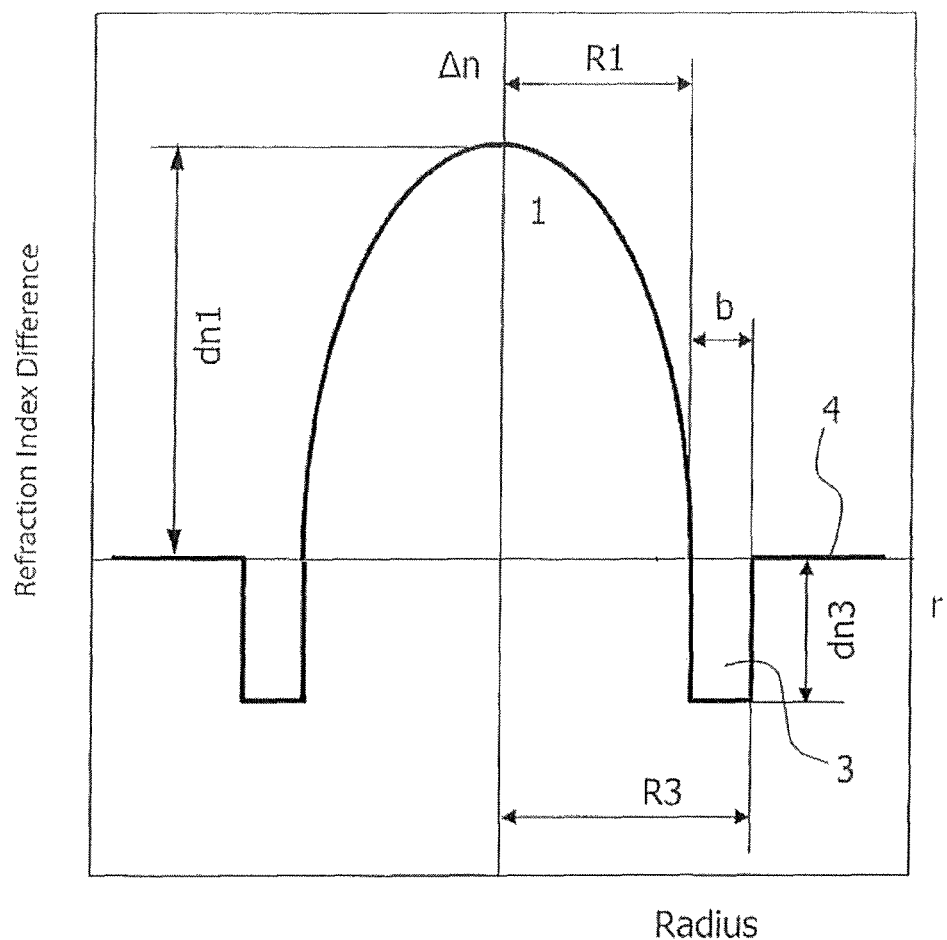
FIG. 4 illustrates a fourth refraction index profile with a gradient index core, without an inner cladding.

FIG. 4 illustrates another embodiment. In this embodiment there is no inner cladding so the trench 3 is directly adjacent to the core 1. The trench extends from R1 to R3 and has a refractive index difference of dn3 with respect to the outer cladding 4.

The light conducting fiber according to the invention was described based on exemplary embodiments. Further embodiments can be derived from the dependent claims. Additional variations are apparent to a person skilled in the art.

REFERENCE NUMERALS AND DESIGNATIONS

1 core
1a core refraction index step
2 inner cladding
3 refraction index trench
4 outer cladding
5 bar=abbreviation for inner cladding
R1 core radius
R2 inner cladding radius
R3 outer cladding trench radius dn1 core refraction index difference
dn2 inner cladding-refraction index difference
dn3 trench refraction index difference
dn4 refraction index step at the core boundary relative to the outer cladding refraction index
b refraction index trench width b=R3−R2
B inner cladding width B=R2−R1

What is claimed is:

1. A bend insensitive gradient index multi-mode light conducting fiber, comprising:
   a leakage mode dependent optical core diameter that is uniform over its length and a numerical aperture that is uniform over its length;
   a core; and
   a refraction index trench and an outer cladding,
   wherein the core includes a core radius R1, an alpha-refraction index profile and a core refraction index difference dn1 with respect to the outer cladding,
   wherein the refraction index trench includes a refraction index trench radius R3 and a trench refraction index difference dn3 with respect to the outer cladding,
   wherein the outer cladding includes an outer cladding radius R4 and a refraction index between 1.40 and 1.55,
   wherein for a light wavelength of 850 nm and an overfilled launch (OFL), the optical core diameter for a fiber length in a range between 2 m and 100 m decreases by less than 5% and the numerical aperture decreases by less than 2.5%.

2. The light conducting fiber according to claim 1, wherein the bend related attenuation increase for two turns and a bend radius of 7.5 mm is less than 0.2 dB.

3. The light conducting fiber according to claim 2, wherein the core is enveloped by an inner cladding, wherein the inner cladding includes an inner cladding radius R2 and an inner cladding refraction index difference dn2 with respect to the outer cladding.

4. The light conducting fiber according to claim 3, wherein the inner cladding refraction index difference dn2 has a value of $2 \times 10^{-3}$ to $-3 \times 10^{-3}$ with respect to the outer cladding.

5. The light conducting fiber according to claim 3, wherein the difference of the inner cladding radius R2 and the core radius R1 is 1 to 5 μm.

6. The light conducting fiber according to claim 2, wherein the core has a geometric core diameter between 47.5 and 52.5 and a cladding diameter of 120 to 130 μm.

7. The light conducting fiber according to claim 2, wherein the core has a geometric core diameter between 60 and 65 and a cladding diameter of 120 to 130 μm.

8. The light conducting fiber according to claim 2, wherein the core has a core refraction index step in the amount of dn4, wherein the core refraction index step has a value from $-1.0 \times 10^{-3}$ to $1.0 \times 10^{-3}$.

9. The light conducting fiber according to claim 1, wherein the core has a geometric core diameter between 47.5 and 52.5 and a cladding diameter of 190 to 210 μm.

10. The light conducting fiber according to claim 1, wherein the core has a geometric core diameter between 60 and 65 and a cladding diameter of 190 to 210 μm.

* * * * *